(No Model.) 2 Sheets—Sheet 1.
L. A. HAZARD & W. O. CRAIN
CLOTH PILING MACHINE.

No. 426,809. Patented Apr. 29, 1890.

WITNESSES:
A. O. Babendreier.
John E. Morris.

INVENTORS:
L. A. Hazard
W. O. Crain
BY Chas. B. Mann
ATTORNEY.

(No Model.) 2 Sheets—Sheet 2.
L. A. HAZARD & W. O. CRAIN.
CLOTH PILING MACHINE.
No. 426,809. Patented Apr. 29, 1890.
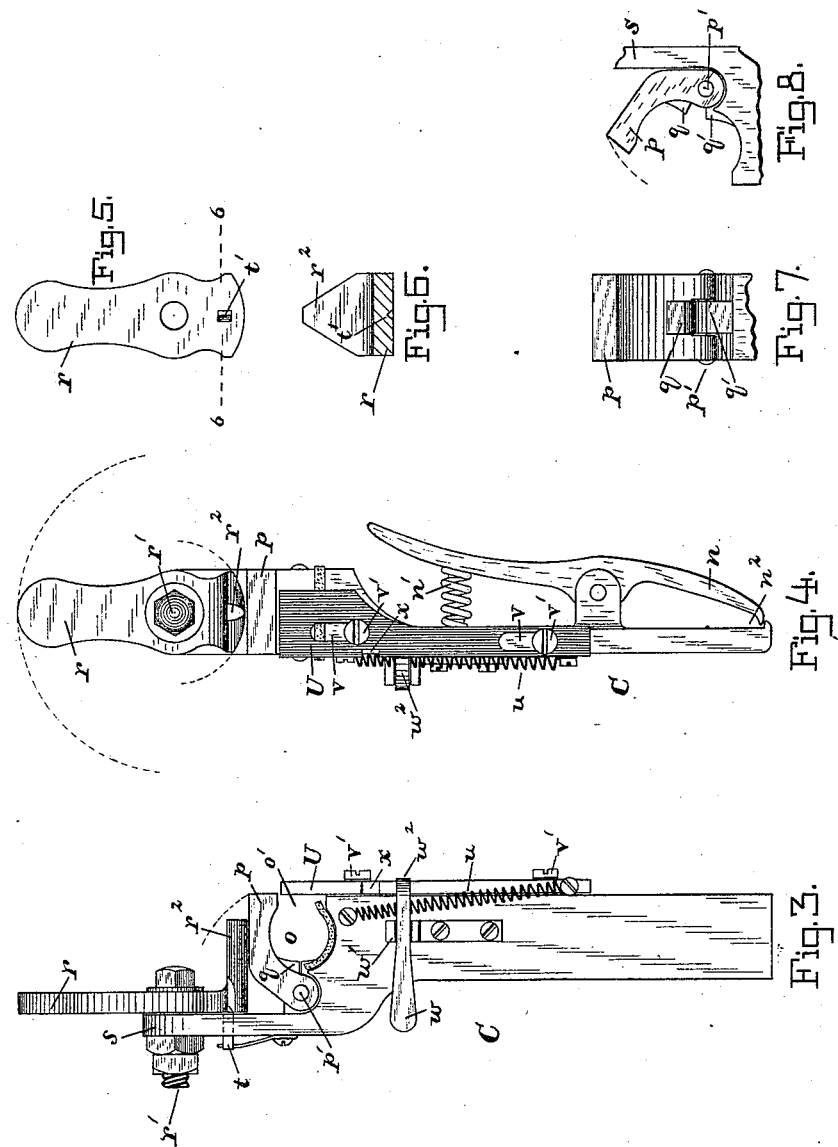
WITNESSES:
A. O. Babendreier.
John E. Morris.
INVENTORS:
L. A. Hazard
W. O. Crain
BY Chas B. Mann
ATTORNEY.

UNITED STATES PATENT OFFICE.

LOUIS A. HAZARD AND WILLIAM O. CRAIN, OF BALTIMORE, MARYLAND, ASSIGNORS OF ONE-HALF TO WISE BROTHERS, OF SAME PLACE.

CLOTH-PILING MACHINE.

SPECIFICATION forming part of Letters Patent No. 426,809, dated April 29, 1890.

Application filed September 19, 1889. Serial No. 324,416. (No model.)

*To all whom it may concern:*

Be it known that we, LOUIS A. HAZARD and WILLIAM O. CRAIN, citizens of the United States, residing at Baltimore, in the State of Maryland, have invented certain new and useful Improvements in Cloth-Spreading Machines, of which the following is a specification.

This invention relates to a machine for spreading cloth in factories where shirts, drawers, overalls, and other articles of personal wear are made or cut in large quantities. In the factories referred to the cloth or fabric to be cut up into shapes for parts of garments is spread on tables, which may be of any length, some now in use being seventy feet or longer. The length, however, is unimportant. Special machines are employed to cut the fabric, which is spread one layer after another on the table until the desired thickness is obtained. Frequently thirty or more layers are thus spread for one cutting.

The object of this invention is to expedite the operation of spreading the cloth.

The invention is illustrated in the accompanying drawings, in which—

Figure 1:
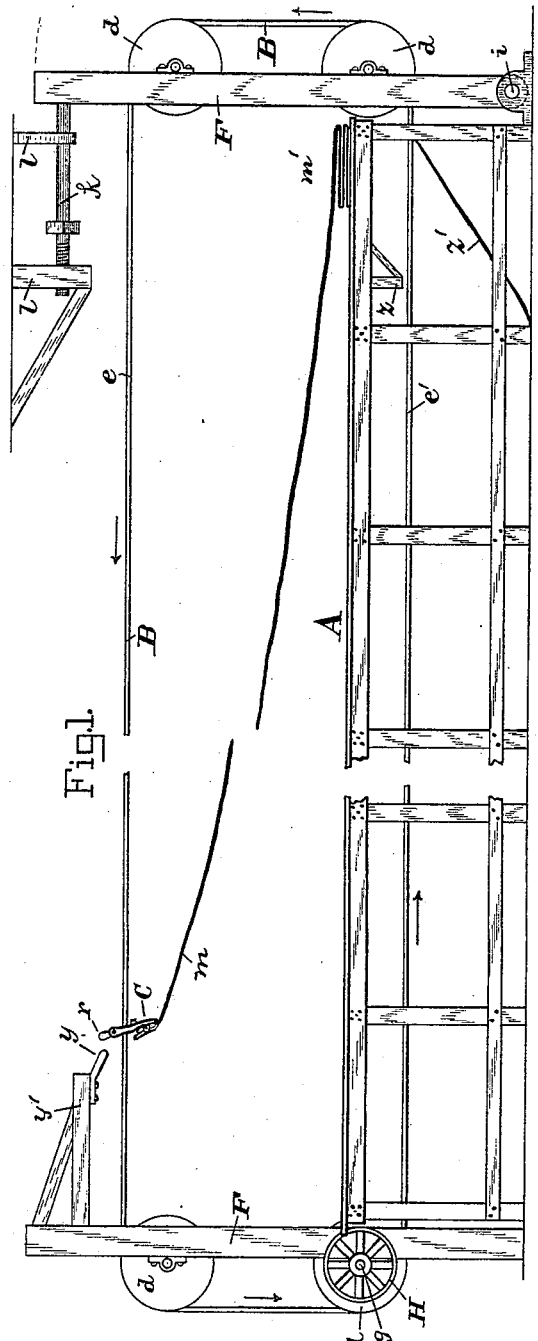
Figure 2:
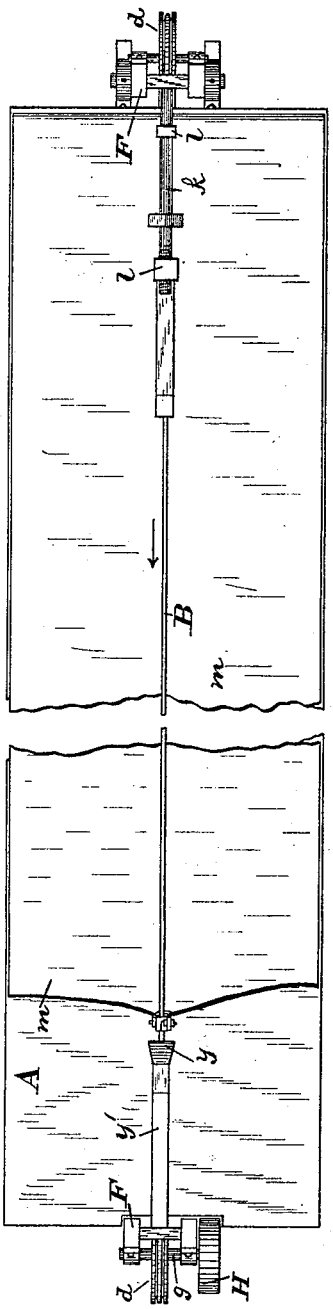

Figure 1 is a side view of a table and the improved apparatus for spreading the cloth. Fig. 2 is a top view of same. Figs. 3 and 4 are side views of the carrier. Figs. 5 and 6 are views of the lock-lever. Figs. 7 and 8 are views of the hinged hanger on the carrier.

The letter A designates a table, B an endless cable on pulleys and stretched so that one part is above the table lengthwise thereof, and C a carrier which grips the end of the cloth and is dragged or carried by the endless cable.

The endless cable B is stretched on pulleys $d$. In the present instance four pulleys are used and are mounted on shafts which have bearings on upright posts F at each end of the table. These pulleys are so placed that two stretches $e\ e'$ are formed lengthwise of the table A, one stretch $e$, which is the forward-moving one, being above the table-top, and the other $e'$, which is the return-stretch, being below the table-top. One of the pulley-shafts $g$ has a drive-pulley H, to which a belt may be applied from any source of power for driving the endless cable. Of course this construction and arrangement may be varied or changed, if desired. In order to provide for keeping the cable tight, one of the said upright posts F is movable and a screw is employed to force and move the post. This post, which is at the right hand of Fig. 1, has one end secured by a pivot $i$, and the other end has a screw $k$ abutting against it. This screw turns and advances in the bearings $l$, one of which is threaded. It will be seen that by turning the screw $k$ one way the post F will be moved, and thereby the endless cable will be stretched.

The carrier C has a gripper or clamp device to take hold of the cloth or fabric $m$. Figs. 3 to 8, inclusive, show the construction of the carrier. The body of the carrier has at its lower end a pivoted grip-jaw $n$, which is kept closed by a spring $n'$. The cloth is gripped at $n^2$ between the end of the jaw and the body. At the upper end of the carrier-body is an eye $o$, which takes on the cable B and allows the grip-jaw end to hang pendent. This eye is formed by a curved hanger $p$, which is attached on top of the body by a joint or hinge $p'$ and leaves a side opening $o'$ below the free end of the hanger. The hinged hanger $p$ has a stop-shoulder $q$, which comes in contact with a seat $q'$ on the body of the carrier and prevents the free end of the hinged hanger from closing down too far. The hinged hanger $p$ is to rest on the upper side of the cable, and a lock-lever $r$ confines the hinged hanger to its closed position. The lock-lever $r$ is connected by a pivot-bolt $r'$ with an upward-extending arm $s$ on the carrier-body. This lever has a foot $r^2$, which presses on top of the hinged hanger $p$ when the lever is vertical, as in Figs. 3 and 4. The lock-lever may swing both ways, as indicated by the curved lines in Fig. 4, to take its foot from the hinged hanger, and when the foot is thus removed said hinged hanger may tilt up. This action takes place and is effected by the knocker $y$ when the carrier is about to be removed from the cable. When the lock-lever is vertical, it is kept in that position by a spring-catch $t$, which works through the back of the upright arm $s$ and engages with a notch $t'$ on the lock-lever. The lock-lever will be released from the catch $t$ by pressure on its upper end, and in the operation of this device this release is effected by the knocker.

A sliding bolt U has slots $v$ and is attached on the side of the carrier-body by screws $v'$ through the slots. This allows the bolt to move up and down. A spiral spring $u$ is connected with the body and bolt and serves to draw the latter upward, so that the upper end of the bolt will close the side opening $o'$ of the eye $o$ and serve, when the carrier is on the cable, to keep the carrier from falling off. A bolt-lever $w$ is pivoted at $w'$ to the carrier-body, and its end $w^2$ will engage a notch $x$ on the sliding bolt, and thereby keep the bolt down. When it is desired to hang the carrier on the endless cable B, the sliding bolt U must be drawn down and held by the bolt-lever $w$. The lock-lever $r$ is turned upright, so that its foot $r^2$ confines the hinged hanger $p$. The eye $o$ will now be open at one side $o'$, and this eye may then take over the cable B, and by pressing the bolt-lever $w$ the sliding bolt U will move up and close the side opening $o'$, and thus confine the carrier upon the cable. The carrier C when on the cable must tilt slightly, as in Fig. 1, to cause the top and bottom of the eye $o$ to pinch or bind on the cable in a manner that will be readily understood. The cloth $m$, gripped by the lower end of the carrier and pulling back on it, will keep the latter tilted, and consequently keep it binding on the cable.

The bolt of cloth $m'$ to be spread is placed upon the initial end of the table (see Fig. 1) and the end of the cloth put in the gripper on the carrier and the latter hung on the upper stretch $e$ of the cable, as described. The moving cable will take the carrier C and draw the cloth attached to the carrier along the whole length of the table.

A stationary knocker or carrier-detaching device $y$ is provided above one end of the table to detach or release the carrier C from the cable. This device consists in the present instance of a plate $y$, secured to a bracket $y'$, which projects forward from the post at the terminal end of the table, a little above the cable B. As the carrier comes along toward this knocker, the lock-lever $r$, projecting upward, will come with some violence against the knocker $y$, and the effect of the concussion will be to turn back the lock-lever, whereupon the hinged hanger $p$ will tilt up and release the carrier C from the cable, and the carrier will drop down upon the terminal end of the table A.

A person in attendance at the terminal end of the table will pick up the carrier and detach it from the end of the cloth and then hang the carrier on the lower stretch $e'$ of the cable below the table. The moving cable will now take the carrier C back to the initial end of the table, below which a knocker $z$ is located. The carrier will fall onto an apron $z'$, of canvas. Here the person in attendance picks the carrier up and again attaches its gripper to the cloth on the bolt and places the carrier, as before, on the upper stretch $e$ of the cable to spread another layer of cloth.

Having described our invention, we claim—

1. In a cloth-spreading machine, the combination, with a table, of a support above the same movable lengthwise thereof and a cloth-carrier wholly supported and carried by said support, whereby cloth piled up at one end of the table may be spread along the table by attaching its end to the carrier and passing it over the top of the table.

2. In a cloth-spreading machine, the combination, with a table, of a support above the same movable lengthwise thereof and a cloth-carrier supported thereby and automatically detachable therefrom.

3. In a cloth-spreading machine, the combination, with a table, of a post at each end, two pulleys supported by each post—one above and one below the table—an endless cable on said pulleys movable lengthwise of the table, a portion of the cable being above and a portion of it below the table, and a detachable cloth-carrier moved in one direction above the table and in the opposite direction below the table.

4. In a cloth-spreading machine, the combination, with a table, of a post at each end, one of which is movable, two pulleys supported by each post, an endless cable on the pulleys movable lengthwise of the table, a detachable cloth-carrier on the cable, bearings adjacent the movable post, and a screw in the bearings one end of which abuts against the movable post.

5. In a cloth-spreading machine, the combination of a table, an endless cable mounted on pulleys, said cable extending lengthwise of the table and having a portion of its length above the same, a cloth-gripper adapted to be attached to the said endless cable, and a stationary detaching device secured above one end of the table to detach the said gripper from the cable.

6. In a cloth-spreading machine, a carrier having a gripper or clamp to take hold of the cloth and provided with an eye open at one side and a bolt to close said side opening.

7. In a cloth-spreading machine, a carrier having a gripper or clamp to take hold of the cloth and having a hanger secured by a joint or hinge and a lock-lever to confine the jointed hanger to its closed position.

8. In a cloth-spreading machine, the combination of a table, an endless cable mounted on pulleys, said cable extending lengthwise of the table and having a portion of its length above the same, a cloth-gripper adapted to be attached to the said endless cable, a hanger and a lock-lever attached to the cloth-gripper, and a knocker to act on the lock-lever, said knocker being secured near one end of the table in proximity to the endless cable.

9. In a cloth-spreading machine, a carrier having a gripper or clamp to take hold of the cloth and provided with an eye open at one side, a bolt to close said side opening, and a spring to act on the bolt and cause it to close said side opening.

In testimony whereof we affix our signatures in the presence of two witnesses.

LOUIS A. HAZARD.
WILLIAM O. CRAIN.

Witnesses:
 JNO. T. MADDOX,
 JOHN E. MORRIS.